Dec. 1, 1964    M. J. STIGLICH    3,159,390
TORSION BAR CONSTRUCTION
Filed Dec. 1, 1961    2 Sheets-Sheet 1
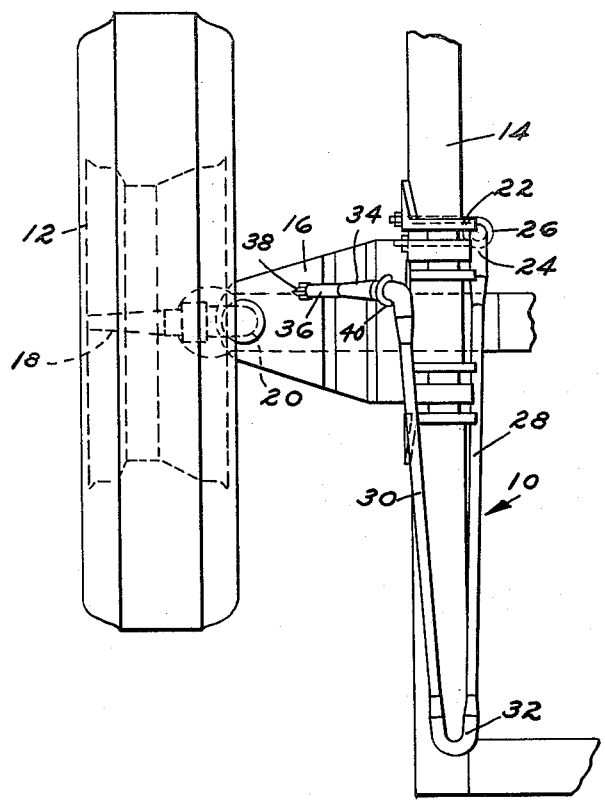
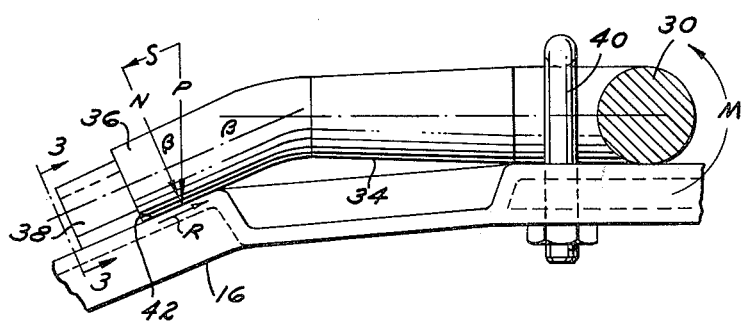
MARTIN J. STIGLICH
INVENTOR.
BY John R. Faulkner
Clifford L. Anderson
ATTORNEYS Dec. 1, 1964  M. J. STIGLICH  3,159,390
TORSION BAR CONSTRUCTION Filed Dec. 1, 1961  2 Sheets-Sheet 2

MARTIN J. STIGLICH
INVENTOR.

BY John R. Faulkner
Clifford L. Sadler
ATTORNEYS

3,159,390
TORSION BAR CONSTRUCTION

Martin J. Stiglich, Plymouth, Mich., assignor to Ford Motor Company, Dearborn, Mich., a corporation of Delaware
Filed Dec. 1, 1961, Ser. No. 156,299
1 Claim. (Cl. 267—57)

The present invention relates generally to torsion bar springs and more particularly to a construction for securing the end of a torsion bar.

Particular problems are presented by the use of a torsion bar spring between pivotally oriented members. As an example, special means must be provided to secure the spring ends to the respective members. In addition, means must be provided to load the torsional portion of the spring.

In accordance with the present invention, it is a principal object to provide a simplified construction for loading and securing the end of a torsion bar spring.

More particularly, the present invention provides a torsion bar with a right-angle bent end portion that is held by a U-bolt or similar device and positioned by the novel geometric configuration of the end portion.

Specifically, the tip of the bent end portion is turned in such a fashion that the spring forces will tend to secure and locate the torsion bar end in position. Therefore it is one of the specific objects of this invention to provide a unique torsion bar end configuration that is held in proper position by its own spring force.

The objects and advantages of the present invention will be more fully comprehended from the following discussion and the accompanying drawings, in which:

FIGURE 1 is a vehicle suspension system incorporating a torsion bar spring construction in accordance with the present invention;

FIGURE 2 is a side elevational view of the torsion bar end construction of FIGURE 1;

Referring now to the drawings for a detailed description of the present invention, like reference numerals identify like parts throughout the various views.

Figure 3:
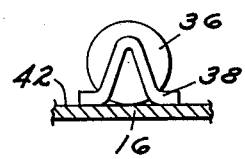
FIGURE 3 is a sectional view taken along section lines 3—3 of FIGURE 2.

FIGURE 1 discloses an independent front suspension system employing a torsion bar spring 10 as the resilient means for supporting the sprung suspension components upon the unsprung components.

A vehicle wheel 12 is rotatably mounted upon a wheel spindle 18. The spindle 18 is connected to a chassis frame member 14 by a suspension arm 16. The suspension arm 16 is universally connected to the wheel spindle 18 by means of a ball joint 20 and the inner end of the arm 16 is pivotally connected to a frame mounted pivot bracket 22.

The torsion bar 10 is formed to have a generally V-shape with an inner end portion 24 secured to the chassis frame member 14 by means of a U-bolt 26. The outer end of the torsion bar 10 is secured to the suspension arm 16.

The torsion bar 10 has a pair of torsional spring portions 28 and 30 that are connected by a U-shaped integral portion 32. The angled portions of the torsion bar 10, such as the major bend 34, that interconnect the straight portions, are enlarged to compensate for the combined bending and torsional stresses that are encountered.

As previously described, the end 24 of spring portion 28 is secured to the chassis member 14 by the U-bolt 26. The outer end of the torsional portion 30 is provided with a right-angle bent portion 34.

FIGURE 2 discloses the details of the connection of the bar end 34 with the suspension arm 16.

The suspension arm 16 is fabricated from sheet metal and has a generally angular contour. The torsion bar end 34 is provided with a tip portion 36 that is slightly bent or turned down. The end face of tip 36 bears against a reaction stop member 38 that is welded to the arm 16. The tip 36 rests upon a surface portion 42 of the arm 16.

The inner end of the end portion 34 is secured to the arm 16 by a U-bolt 40. The U-bolt 40 contains the end 34 against motion in both vertical or longitudinal directions.

Means must be provided to locate the bar end 34 and restrain it against axial movement with respect to the opening through the U-bolt 40. Accordingly, this invention concerns a new method of attaching a torsion bar with a crank end that is bent approximately 90° to the torsional segment of the bar and in which the crank end is positively located and axially contained by means of the geometrical configuration of the bar end.

To insure self-locking and locating of the bar end 34, there must be a force against the reaction member 38 at the tip of the bar 36. This force insures that any impending movement will be towards the reaction member 38 and not towards the axis of torsional portion 30. In order to achieve this objective, the force tending to push the bar towards the reaction member 38 must exceed the frictional force between the tip of the bar 36 and the adjacent surface 42 of the arm 16.

In FIGURE 2, a certain torsional moment M exists in the torsional portion 30. The moment M produces a reactive force P that is perpendicular to the axis of the end portion 34. Force P has a component force S that is parallel to the axis of the tip 36 and also parallel to the surface 42 of the arm 16 upon which the tip 36 rests. There is also a component N of force P that is normal to the surface 42. A frictional force R exists at the intersection of the tip 36 with the surface 42 that is equal to the coefficient of friction $\mu$ of the contacting surfaces multiplied times the normal force N.

The tip 36 of the bent end 34 is turned at an angle $\beta$ that is equal to the angle that component N makes with force P. If the force S against the reaction member 38 is to exceed the frictional force R, then it is mathematically determinable that angle $\beta$ must exceed the friction angle (the angle where motion impends). If the angle $\beta$ is to be greater than the friction angle, then the tangent of angle $\beta$ must be greater than the tangent of the friction angle.

The tangent of the friction angle is equal to $\mu$, the coefficient of friction and, therefore, the tangent of angle $\beta$ must be greater than the coefficient of friction. It is a relatively simple matter to determine the coefficient of friction between the surface of the tip 36 and the surface 42 of the arm 16 and this determination will indicate the appropriate angle $\beta$. From the formula that the tangent of angle $\beta$ must exceed the coefficient of friction, we can determine the extent to which the tip 36 must bend relative to the end portion 34.

The coefficient of friction is extremely variable being dependent upon the materials in contact and upon the condition of the contacting surfaces. A typical coefficient of friction might be approximately 0.3 which, in turn, would mean that the angle $\beta$ should be greater than approximately 16.5°. Thus, according to the theory of the present invention, the tip 36 of the torsion bar may be turned down at an angle greater than 16.5° so that a force S will be exerted against the reaction member 38 resulting from torsional moment M. This force S, in effect, will tend to prevent the torsion bar end 34 from creeping out of securement by the U-bolt 40.

Figure 4:
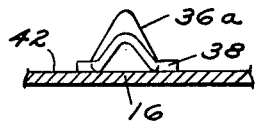
FIGURE 4 is a view corresponding to FIGURE 3 showing a modification of the present invention.
Figure 5:
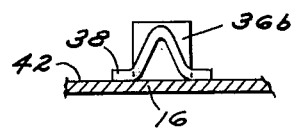
FIGURE 5 is a view corresponding to FIGURE 3 disclosing a further modification of the present invention.
Figure 6:
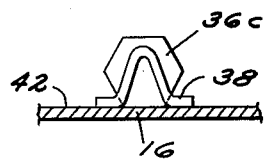
FIGURE 6 is a still further modification of the construction of FIGURE 3.

In the principal embodiment, the torsion bar tip 34 is of a conventional circular cross section and theoretically has a straight-line contact with the surface 42 of the arm 16. In order to obtain more consistent results, it may be advisable to have an end bar configuration, such as 36a, 36b or 36c disclosed in the alternate constructions of FIGURES 4, 5 and 6 respectively. These constructions have a common feature of a bar end that presents a flat face to the sheet metal arm surface 42. This construction, in addition to providing consistent operation, also reduces the tendency to corrosion.

The foregoing description presents the presently preferred embodiment and alternate constructions of this invention. Other arrangements may occur to those skilled in the art which will come within the scope and spirit of the invention as defined in the following claims.

I claim:

A suspension device including a pair of pivotally connected members, a torsion bar operatively interposed between said members, and having one of its ends secured to one of said members and the other of its ends secured to the other of said members, said bar having a torsional segment and an end portion, said torsional segment having an axis extending in the same general direction as the axis of the pivotal connection between said members, said end portion having an axis extending generally normal to the axis of said torsional segment and the axis of the pivotal connection between said members, said end portion having a tip portion and said tip portion having an axis said tip portion axis forming a set angle with a radius extending from the axis of said torsional segment and forming an angle with the axis of said end portion, a tip receiving surface formed on said one member at an angle complementing the said set angle, said tip portion having a flat face lying in flush engagement with said tip receiving surface and parallel to said tip portion axis, said set angle of said tip porton axis beng greater than the friction angle between said receiving surface and said flat face, and a reaction member affixed to said one member and located against the extremity of said tip portion.

References Cited in the file of this patent

UNITED STATES PATENTS

| | | |
|---|---|---|
| 2,825,576 | Allison | Mar. 4, 1958 |
| 2,894,277 | Bogater et al. | July 14, 1959 |
| 3,037,789 | Allison | June 6, 1962 |

FOREIGN PATENTS

| | | |
|---|---|---|
| 165,191 | Australia | Sept. 14, 1955 |